Aug. 24, 1954 — J. G. TUDDENHAM — 2,687,114
ANIMAL CONTROLLED HOPPER AND TROUGH TYPE PIG FEEDER
Filed Dec. 7, 1951 — 2 Sheets-Sheet 1

INVENTOR
J. G. TUDDENHAM
BY
ATTORNEY

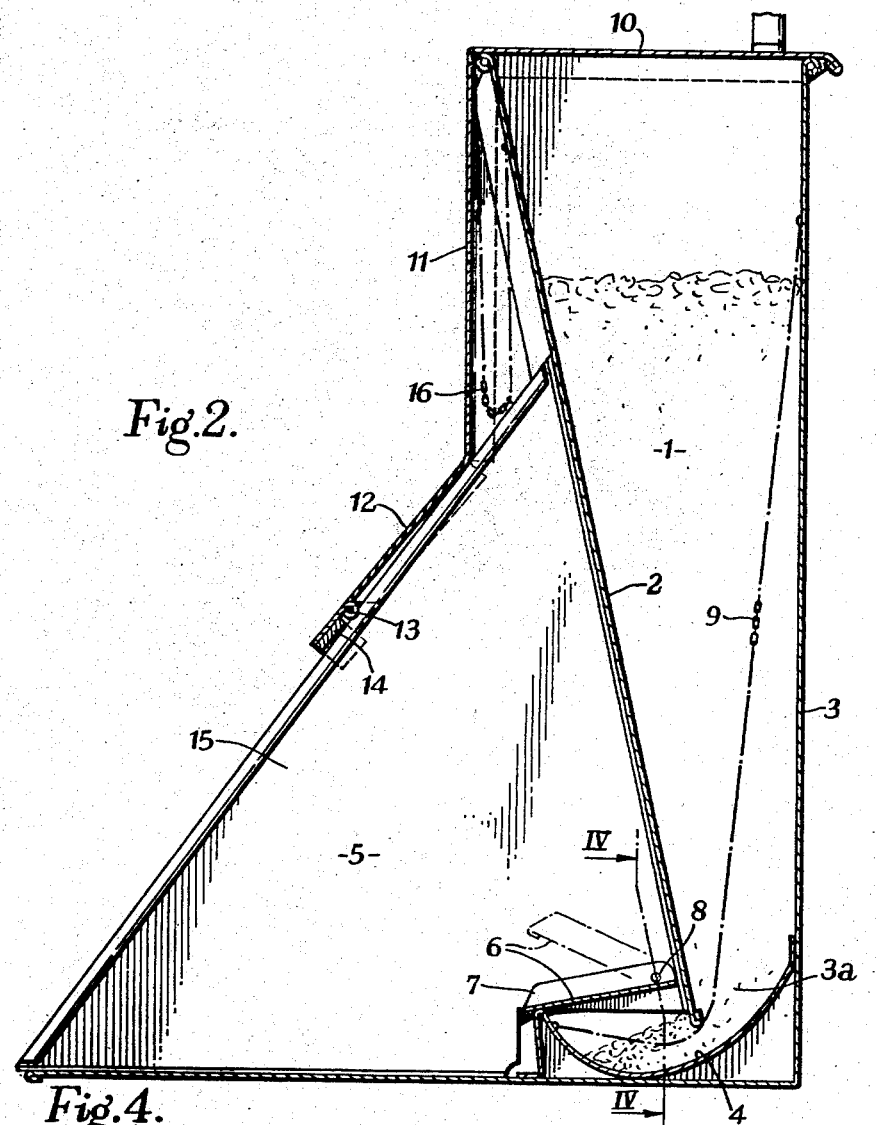
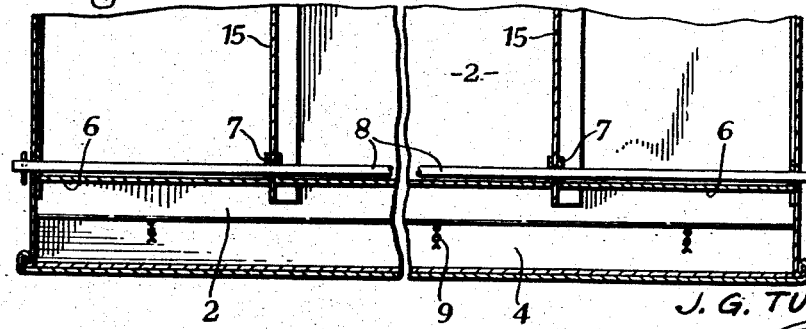

Patented Aug. 24, 1954

2,687,114

UNITED STATES PATENT OFFICE 2,687,114

ANIMAL CONTROLLED HOPPER AND TROUGH TYPE PIG FEEDER

James G. Tuddenham, Cawston, Norfolk, England

Application December 7, 1951, Serial No. 260,517

Claims priority, application Great Britain March 7, 1951

3 Claims. (Cl. 119—54)

The present invention relates to means intended primarily for feeding piglets and has for its object to provide such means which will promote the rapid growth of piglets by their introduction to solid food before they are weaned.

The invention aims at providing such means which can only be used by piglets and which is so designed as to exclude pilfering of the food by larger animals e. g. sows and also to protect the food against contamination by foreign matter; from being made wet by rain, and also to prevent birds or pests filching the food.

According to the present invention, there is provided means primarily intended for feeding piglets which comprises in combination of food storage hopper from which food can gravitate into a feeding trough which is accessible to the piglets by way of separate cubicles, compartments, entrances or the like, which are each of such a size as to permit the entry of a piglet but exclude animals, e. g. sows of a larger size.

In order that the invention may be clearly understood and readily carried into effect, reference will now be made to the accompanying drawings which illustrate a preferred form of the invention by way of example. In the drawings:

Figure 2 is a vertical section drawn to a larger scale and showing the lid closed.

Figure 4 is a section taken on the line IV—IV of Figure 2.

Figure 1:
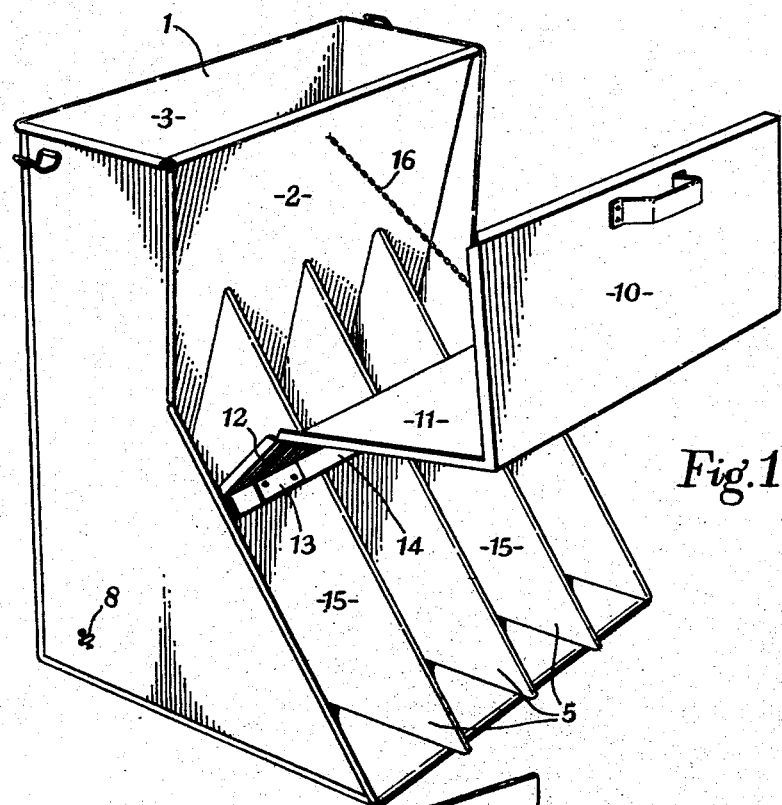
Figure 1 is a perspective view of the complete feeder showing a closure lid for the hopper in the open position.
Figure 3:
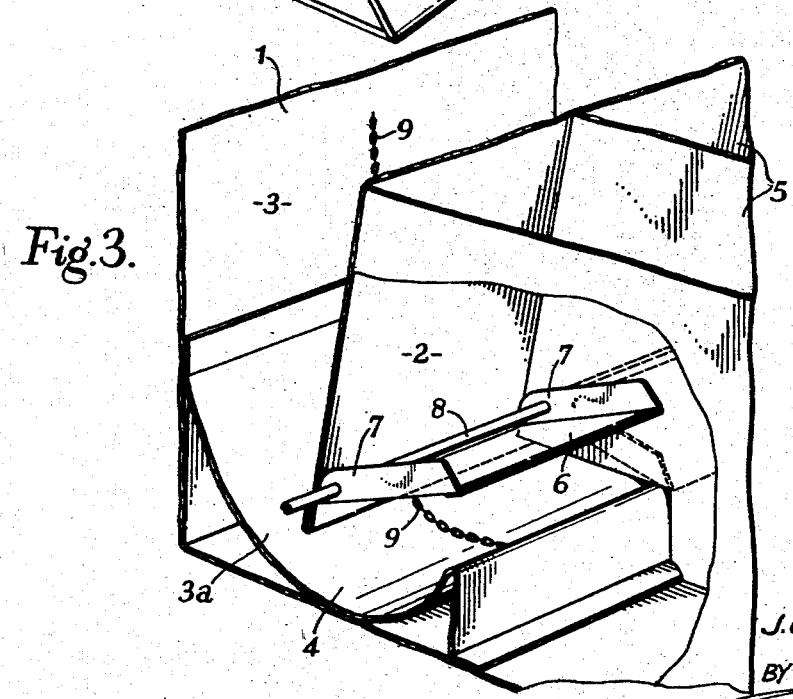
Figure 3 is a fragmentary sectional view with parts broken away to show the food trough in each compartment with a closure lid therefor raised slightly.

Referring to the drawings, the back of the feeder is constructed to constitute a storage hopper 1 for the pig food and the front wall 2 of this hopper slopes downwardly towards the rear wall 3 of the hopper so that the cross sectional area at the lower end of the hopper is smaller than that of the top end of the hopper. The lower end 3a of this hopper is open and communicates with a trough 4 into which a supply of food constantly falls as it is devoured by the piglets, the trough projecting in front of the lower end of the front wall 2 as shown.

The front of the hopper comprises four or any other desired number of cubicles, compartments, entrances or the like 5, which are each of such a size that only a piglet can enter. The trough 4 at the lower end of the hopper is a single trough extending the full width of the feeder and passes through openings in the inner ends of the cubicles so that a portion of the trough is housed in each cubicle. Alternatively the open lower end 3a of the hopper communicates with separate troughs 4 disposed one on each of the cubicles 5. The portion of the trough 4 in each cubicle 5 is fitted with a hinged lid 6 which normally closes the top of said portion of the trough and this lid 6 is adapted to be raised upwardly and rearwardly about a hinge until it swings against the inclined front wall 2 of the hopper whereby, as the lid is prevented from being swung into a vertical position, it will automatically fall to close the portion of the trough when released.

Each lid 6 is formed with upturned flanger 7 at its ends and the rear ends of the flanges are formed with hole through which is passed a rod 8 extending the full width of the device and on which the lids 6 can pivot independently.

When piglets are about a week old, they can be introduced to the feeder, the lids 6 giving access to the food being opened on the first few occasions. Within a few days, however, the piglets will instinctively lift the lids 6 to gain access to the food and the lid will close automatically afterwards.

To ensure that the food in the hopper will gravitate to the trough 4 without clogging, each portion of the trough in a cubicle 5 has anchored thereto the lower end of a chain 9 which is secured at its upper end to the rear wall 3 of the hopper adjacent to the upper end of the latter. Each chain between its ends e. g. where it passes under the lower edge of the front wall 2 is held against contact with the back wall 3 of the hopper so that the chain passes through the mass of food. As the piglets eat, the chains 9 are disturbed and moved and will agitate slightly the food in the hopper 3 so that it cannot clog therein.

The open top of the hopper 3 is closed by a cover 10 which comprises a normally vertical portion 11 which depends from the front edge of the cover 10 and which covers the upper part of the front wall 2 of the hopper and which then merges into a forwardly and downwardly inclined portion 12 which covers the upper extremities of the cubicles 5 leaving sufficient room for piglets to pass thereunder.

The lower edge of this inclined portion is hinged at 13 to a horizontal rail 14 extending across the front edges of triangular shaped walls or partitions 15 extending forwardly from the front wall 2 of the hopper and forming the side walls of the cubicles 5 the inclined edge or hypotenuse of each of these walls extending downwardly and forwardly from the front face of the hopper to the front end of the cubicles. A chain 16 is provided for limiting the opening of the lid and supporting same when in an open position as shown in Figure 1.

By means of the present invention, the food at all times is kept in perfect condition, waste is eliminated and no attention is required apart from filling the hopper 3 from time to time. Conveniently the entire appliance may be constructed of galvanised iron or other suitable material.

What I claim is:

1. A feeder for piglets to the exclusion of larger animals, comprising, in combination, a housing having a bottom wall, a rear wall and side walls whose lower front edges are inclined rearwardly and upwardly to intersect upper front edges which are parallel to the rear wall, an inner wall connected at its upper end to related upper front corner portions of the side walls and extending downwardly and inwardly toward the rear wall to define a hopper open at its top and also open at its lower end to provide a feed discharge opening extending throughout the width of the inner portion of the housing, a continuous trough below said discharge opening and extending from end to end of the housing and from the rear wall beneath the terminal edge of said inner wall to a point forwardly thereof to provide a feed access area, a plurality of partitions of substantially triangular shape cut away at their lower inner corners to provide clearances for said continuous trough, said partitions arranged in spaced relation between the upwardly inclined portions of the side walls to provide compartments each to receive the head and a portion of the body of a piglet having access to a portion of the feed access area of the trough defined by related partitions, a self closing trough lid between each pair of compartment forming partitions, and a cover pivoted at its lower end to the inclined rearwardly and upwardly front edges of the side walls and having a top for closing the charging end of the hopper and also having angularly related front wall portions adapted to close the front portion of the casing between the upper portions of the partitions and the upper front edge of the inner wall.

2. A feeder for piglets according to claim 1 wherein the trough lids in each compartment are mounted on a common shaft located adjacent the lower end of the inner wall.

3. A feeder for piglets according to claim 1 wherein each compartment is provided with a flexible feed agitator having its upper end anchored to the rear wall and its lower end anchored to the front portion of the feed trough.

References Cited in the file of this patent

UNITED STATES PATENTS

| Number | Name | Date |
| --- | --- | --- |
| 1,304,107 | Shenk | May 20, 1919 |
| 1,601,030 | Love | Sept. 28, 1926 |
| 1,719,245 | Smidley | July 2, 1929 |
| 2,522,635 | Pittenger et al. | Sept. 19, 1950 |
| 2,533,538 | Uhrenholdt | Dec. 12, 1950 |